(12) United States Patent
Laskar

(10) Patent No.: US 9,662,572 B1
(45) Date of Patent: May 30, 2017

(54) SEAMLESS CONTINUATION OF ENTERTAINMENT CONTENT

(71) Applicant: Le Technology, Inc., San Jose, CA (US)

(72) Inventor: Supratim Laskar, San Diego, CA (US)

(73) Assignee: Le Technology, Inc., San Jose, CA (US)

( * ) Notice: Subject to any disclaimer, the term of this patent is extended or adjusted under 35 U.S.C. 154(b) by 0 days.

(21) Appl. No.: 15/232,635

(22) Filed: Aug. 9, 2016

(51) Int. Cl.
 *G06F 15/16* (2006.01)
 *A63F 13/33* (2014.01)
 *H04L 29/06* (2006.01)
 *H04L 29/08* (2006.01)
 *H04W 76/02* (2009.01)
 *H04L 12/28* (2006.01)
 *A63F 13/25* (2014.01)
 (Continued)

(52) U.S. Cl.
 CPC .............. *A63F 13/33* (2014.09); *A63F 13/25* (2014.09); *A63F 13/35* (2014.09); *A63F 13/493* (2014.09); *A63F 13/92* (2014.09); *H04L 12/2854* (2013.01); *H04L 65/4069* (2013.01); *H04L 67/10* (2013.01); *H04L 67/26* (2013.01); *H04L 67/306* (2013.01); *H04L 67/327* (2013.01); *H04L 67/42* (2013.01); *H04W 76/02* (2013.01)

(58) Field of Classification Search
 CPC ... H04L 65/4069; H04L 67/10; H04L 67/306; H04L 67/327
 See application file for complete search history.

(56) References Cited

U.S. PATENT DOCUMENTS 7,127,735 B1 * 10/2006 Lee ..................... H04N 7/17336
 348/E7.073
8,365,235 B2  1/2013 Hunt et al.
 (Continued)

OTHER PUBLICATIONS

"Say Hello to the New AnyRoom® DVR" downloaded Jun. 23, 2016 from http://www.xfinity.com/anyroomdvr/, 2 pages.
(Continued)

*Primary Examiner* — Moustafa M Meky
(74) *Attorney, Agent, or Firm* — Rutan & Tucker, LLP

(57) ABSTRACT

Provided herein in some embodiments is a system and a method including a first client-entertainment module of a first mobile-computing device and a first client-entertainment profile associated with the first client-entertainment module. The first client-entertainment module can be configured to cooperate with i) a server-entertainment module on a server computer or ii) a second client-entertainment module on a second mobile-computing device to provide a seamless continuation of entertainment content at a specific point in the entertainment content on the second mobile-computing device. The first client-entertainment profile can be configured to track user interaction with entertainment content and features thereof to provide the specific point for the seamless continuation of the entertainment content. The first client-entertainment module can be configured to communicate with the server entertainment module and the second client-entertainment module to respectively update a server entertainment profile and a second client-entertainment profile in accordance with the first client-entertainment profile.

20 Claims, 10 Drawing Sheets

Figure 1A:
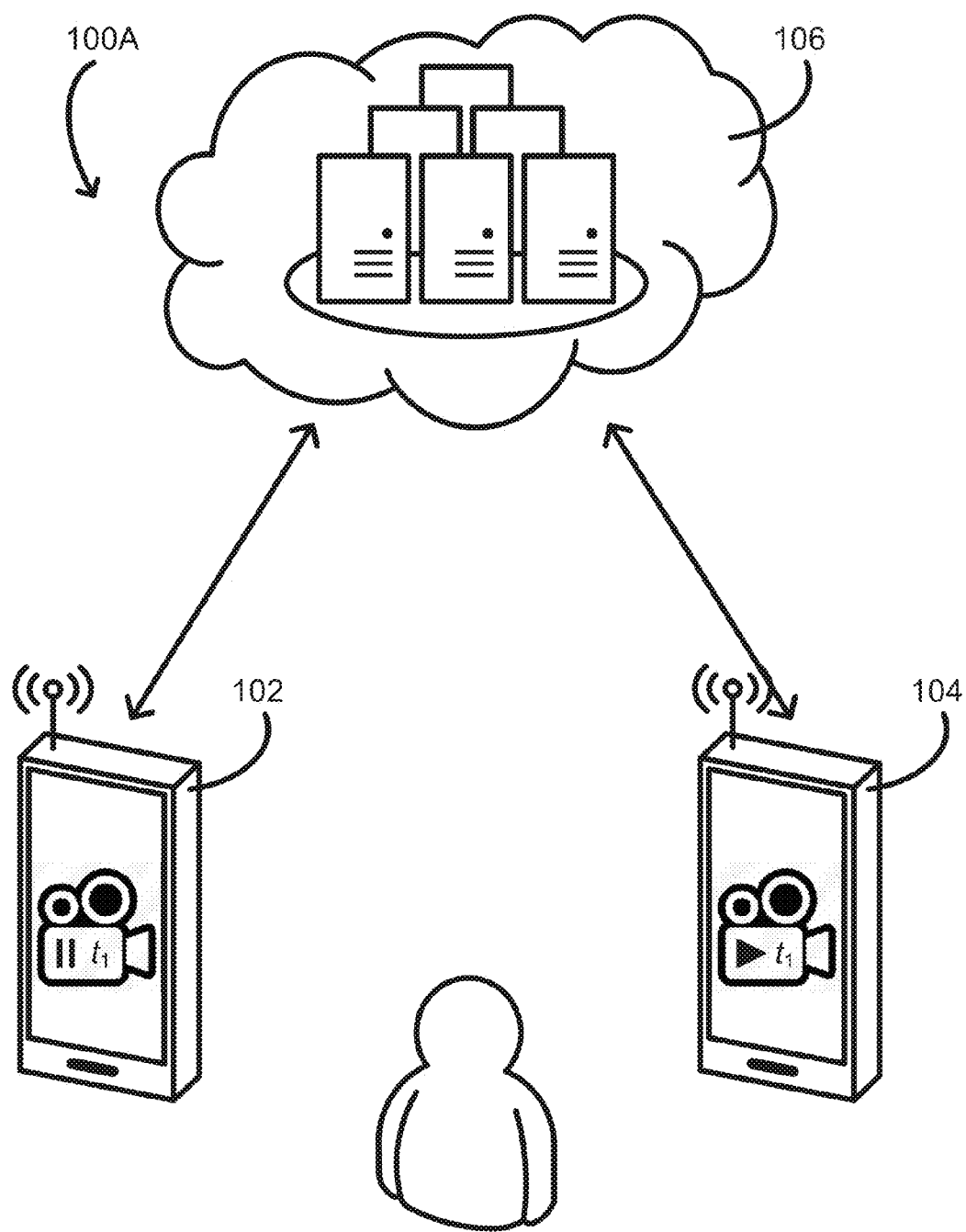

(51) Int. Cl.
*A63F 13/92* (2014.01)
*A63F 13/35* (2014.01)
*A63F 13/493* (2014.01)

(56) References Cited

U.S. PATENT DOCUMENTS

| | | | |
|---|---|---|---|
| 8,606,948 B2* | 12/2013 | Evans | G06F 9/4443 |
| | | | 709/230 |
| 8,750,677 B2* | 6/2014 | Brown | H04N 21/25875 |
| | | | 386/241 |
| 8,880,648 B1* | 11/2014 | Arora | H04N 21/4126 |
| | | | 709/218 |
| 2011/0029597 A1* | 2/2011 | Morinaga | H04L 65/4092 |
| | | | 709/203 |
| 2013/0051755 A1 | 2/2013 | Brown et al. | |
| 2014/0032636 A1* | 1/2014 | Nelson | H04N 21/2343 |
| | | | 709/203 |
| 2014/0108623 A1 | 4/2014 | Gunderson et al. | |
| 2015/0215382 A1* | 7/2015 | Arora | H04N 21/4126 |
| | | | 382/118 |

OTHER PUBLICATIONS

Strickland, Jonathan and Bickers, James "How DVR Works", 5 pages, downloaded Jun. 23, 2016 from http://electronics.howstuffworks.com/dvr2.htm.

"How Does the Slingbox Work?", 3 pages, downloaded Jun. 23, 2016 from http://www.slingbox.com/en-US/Support/KB/KB-2000053.aspx.

\* cited by examiner

SEAMLESS CONTINUATION OF ENTERTAINMENT CONTENT

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

FIELD

Embodiments of the design provided herein generally relate to seamless continuation of entertainment content across electronic devices.

BACKGROUND

Users of electronic devices often have multiple electronic devices. For example, users often have two or more electronic devices selected from smart phones, tablet computers, personal computers, smart bicycles, virtual or augmented reality headsets, smart vehicles, and the like. Users of the foregoing electronic devices also increasingly use their electronic devices to consume entertainment content. Provided herein are systems and methods that address consuming entertainment content across multiple devices.

SUMMARY

Provided herein in some embodiments is a system and a method including a first client-entertainment module of a first mobile-computing device and a first client-entertainment profile associated with the first client-entertainment module. The first client-entertainment module can be configured to cooperate with i) a server-entertainment module on a server computer or ii) a second client-entertainment module on a second mobile-computing device to provide a seamless continuation of entertainment content at a specific point in the entertainment content on the second mobile-computing device. The first client-entertainment profile can be configured to track user interaction with entertainment content and features thereof to provide the specific point for the seamless continuation of the entertainment content. The first client-entertainment module can be configured to communicate with the server-entertainment module and the second client-entertainment module to respectively update a server entertainment profile and a second client-entertainment profile in accordance with the first client-entertainment profile.

These and other features of the design provided herein can be better understood with reference to the drawings, description, and claims, all of which form the disclosure of this patent application.

DRAWINGS

The drawings refer to some embodiments of the design provided herein in which:

FIG. 1A provides a schematic illustrating a seamless continuation of entertainment content between a first and a second electronic device in accordance with some embodiments.

Figure 1B:
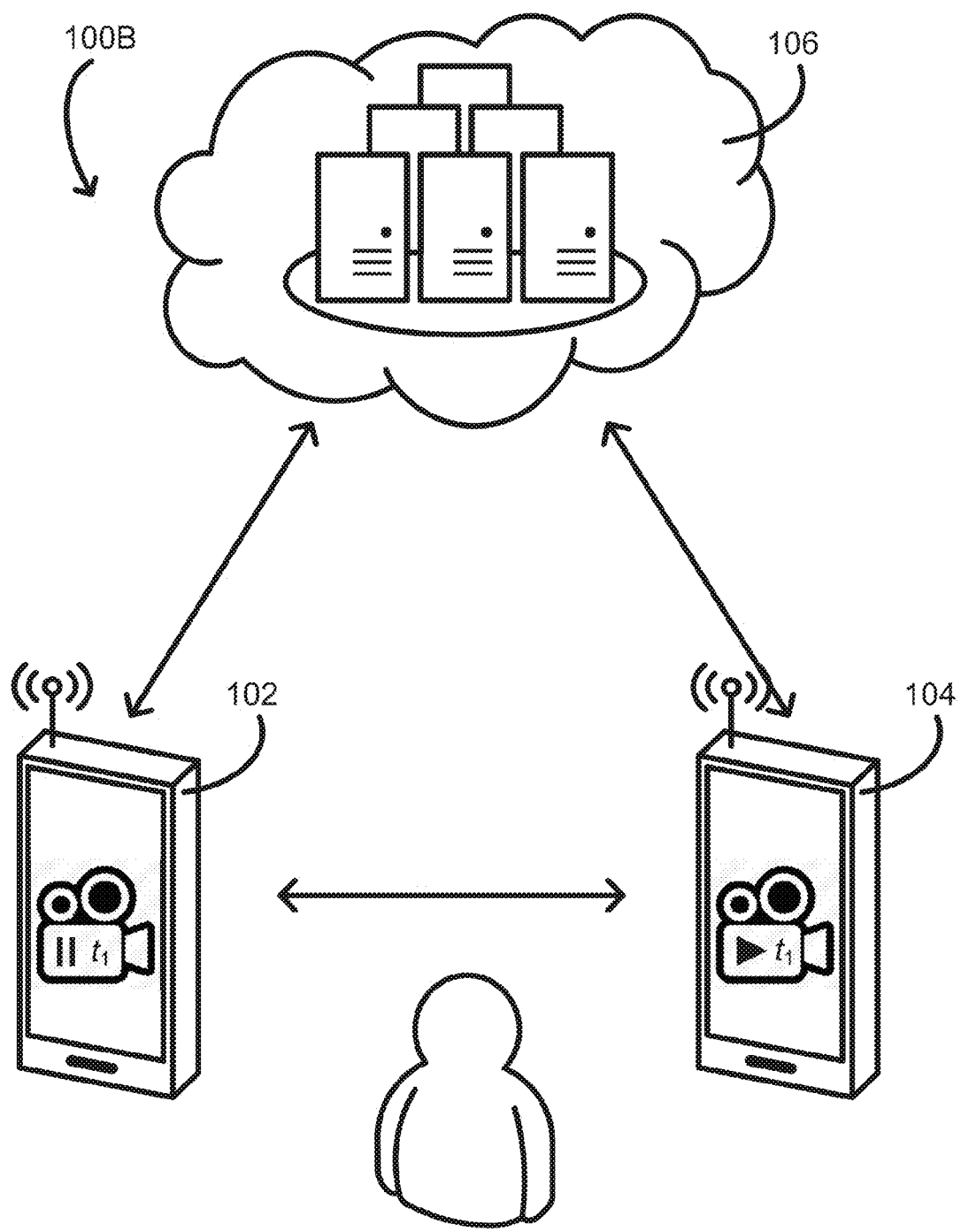

FIG. 1B provides a schematic illustrating a seamless continuation of entertainment content between a first and a second electronic device in accordance with some embodiments.

Figure 2A:
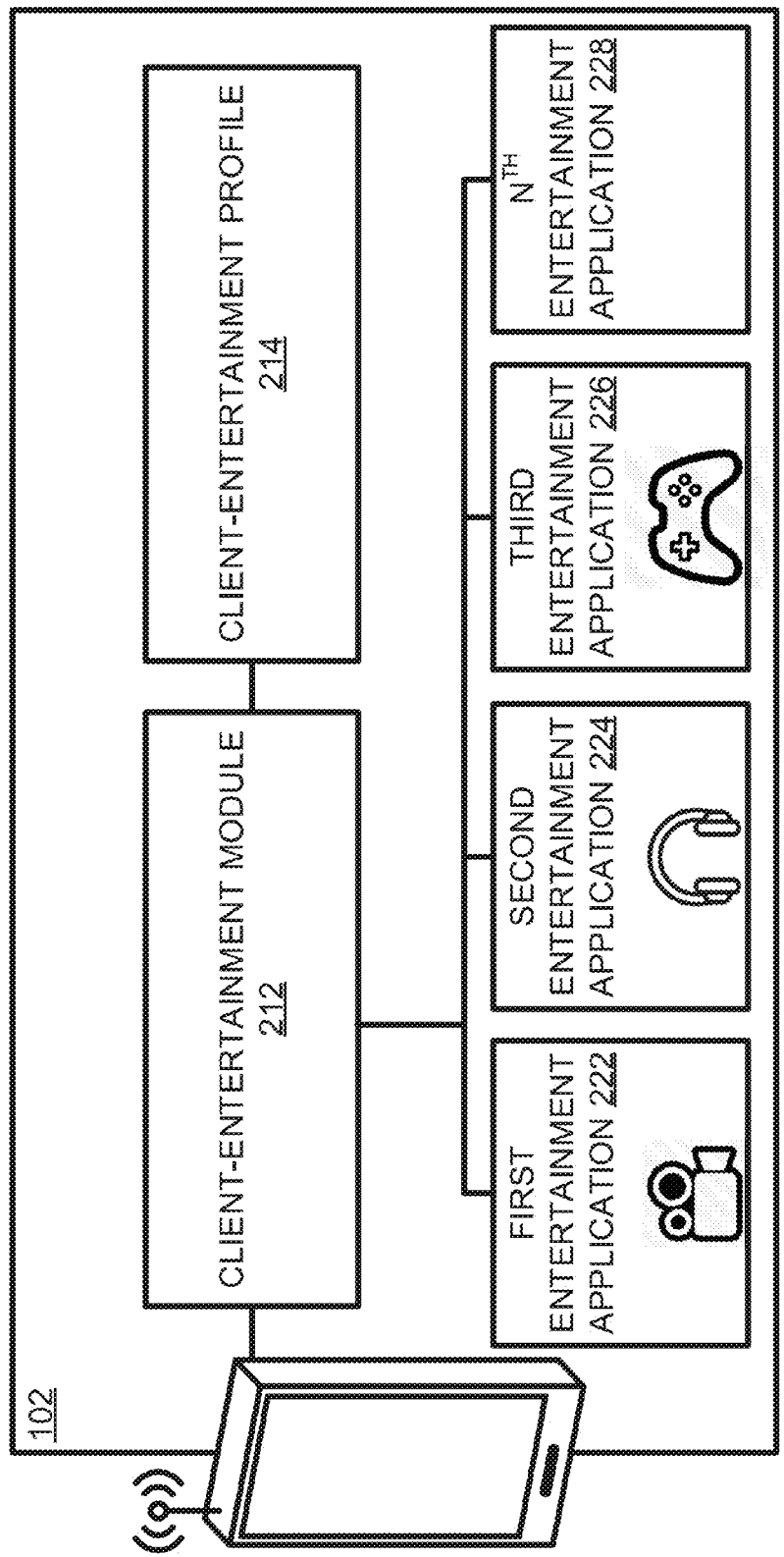

FIG. 2A provides a schematic illustrating an electronic device including a client-entertainment module, a client-entertainment profile, and a number of entertainment applications in accordance with some embodiments.

Figure 2B:
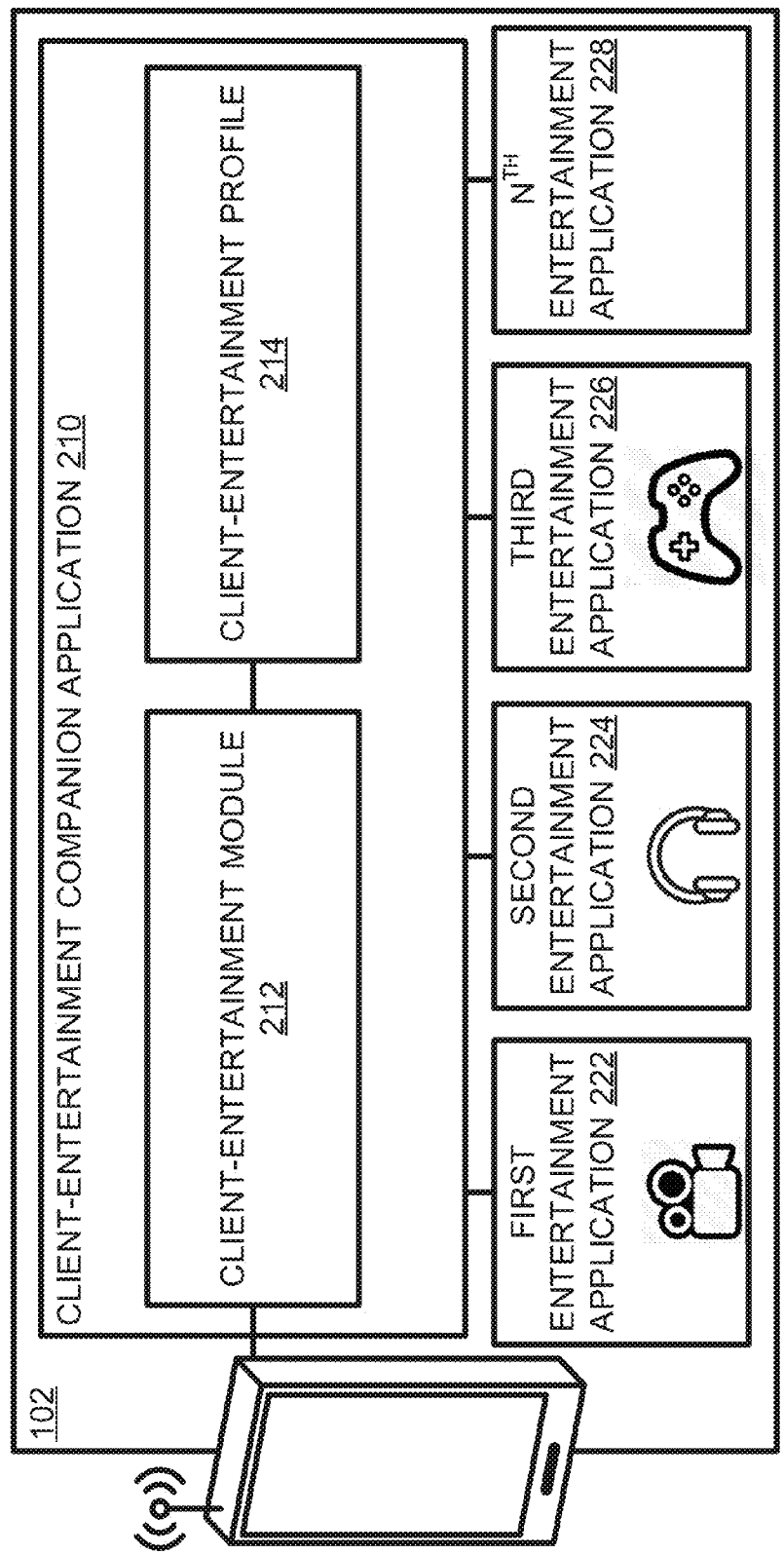

FIG. 2B provides a schematic illustrating an electronic device including a client-entertainment companion application including a client-entertainment module and a client-entertainment profile, as well as a number of entertainment applications in accordance with some embodiments.

Figure 3A:
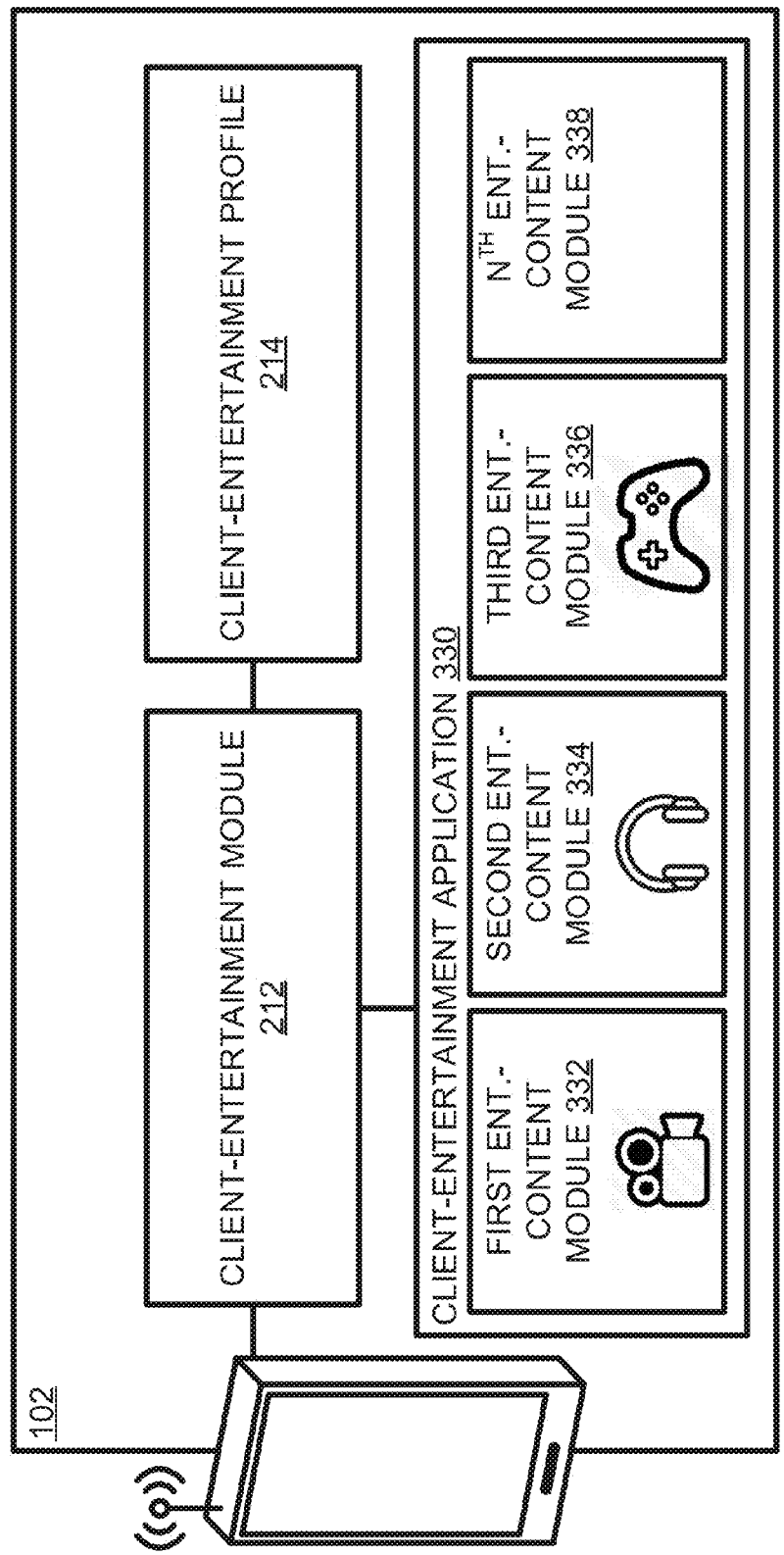

FIG. 3A provides a schematic illustrating an electronic device including a client-entertainment module, a client-entertainment profile, and a client-entertainment application including a number of entertainment-content modules in accordance with some embodiments.

Figure 3B:
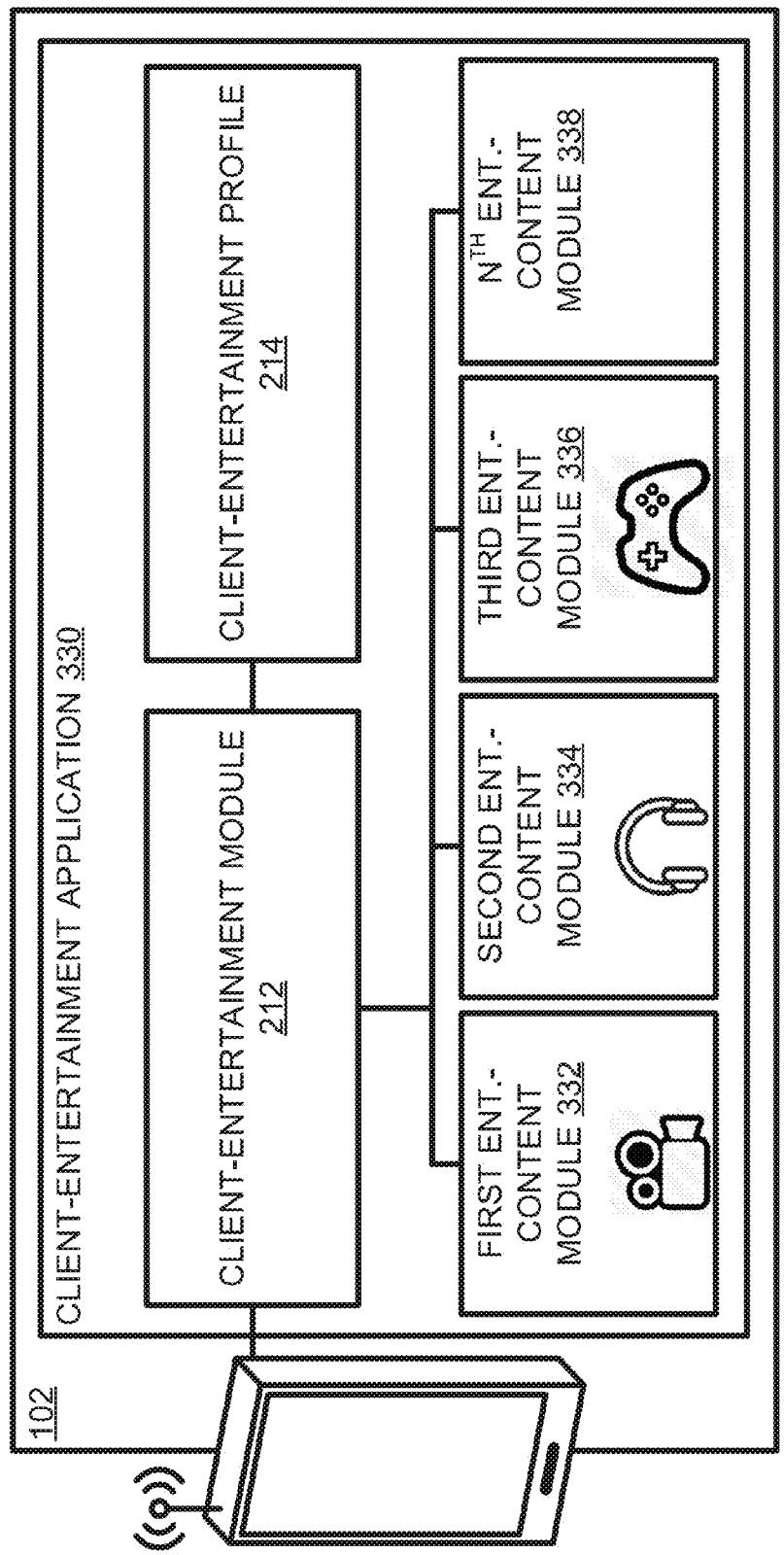

FIG. 3B provides a schematic illustrating an electronic device including a client-entertainment application including a client-entertainment module, a client-entertainment profile, and a number of entertainment-content modules in accordance with some embodiments.

Figure 4A:
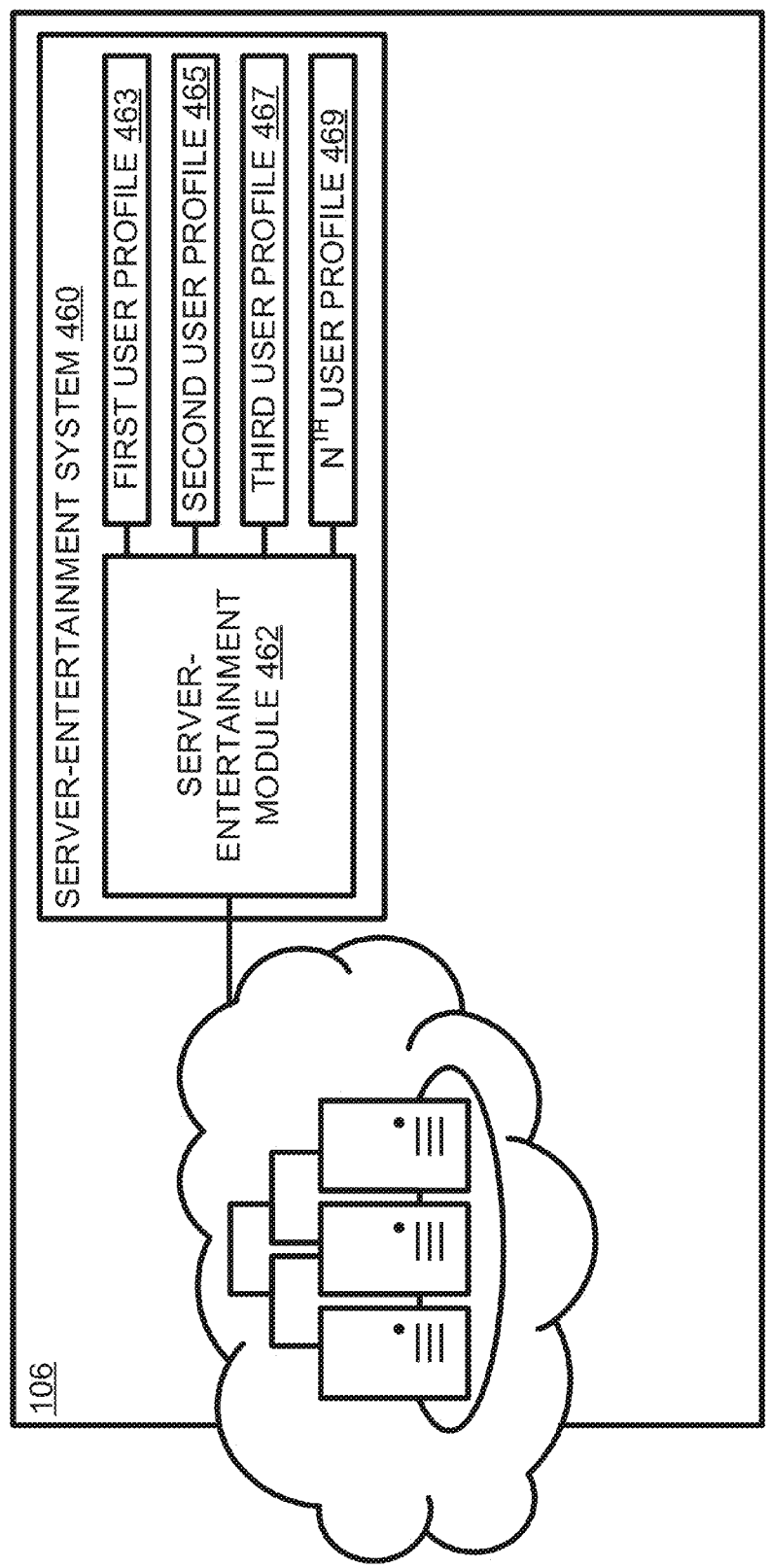

FIG. 4A provides a schematic illustrating one or more server computers including a server-entertainment system including a server-entertainment module and a number of user entertainment profiles in accordance with some embodiments.

Figure 4B:
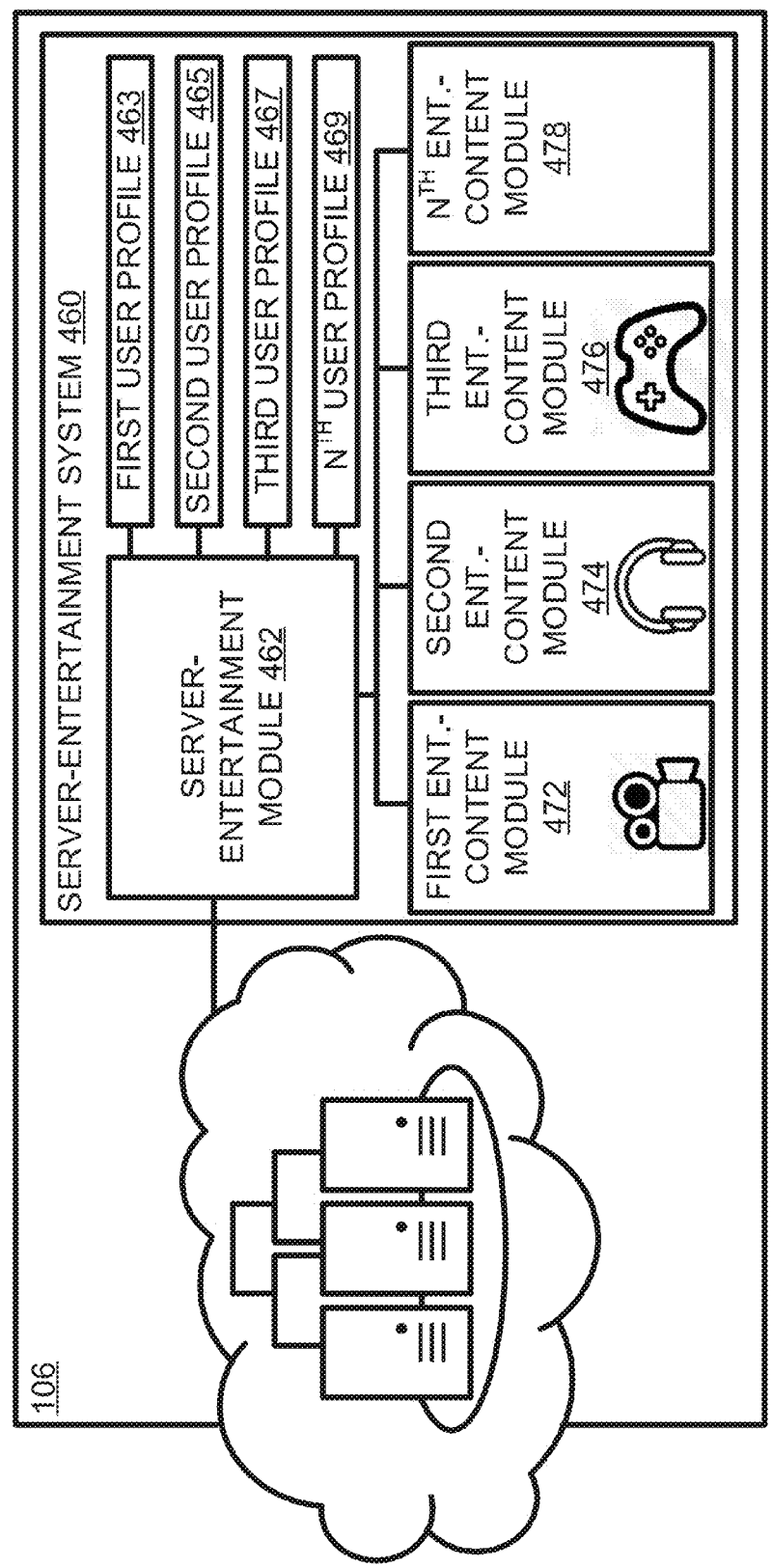

FIG. 4B provides a schematic illustrating one or more server computers including a server-entertainment system including a server-entertainment module, a number of user entertainment profiles, and a number of entertainment-content modules in accordance with some embodiments.

Figure 5:
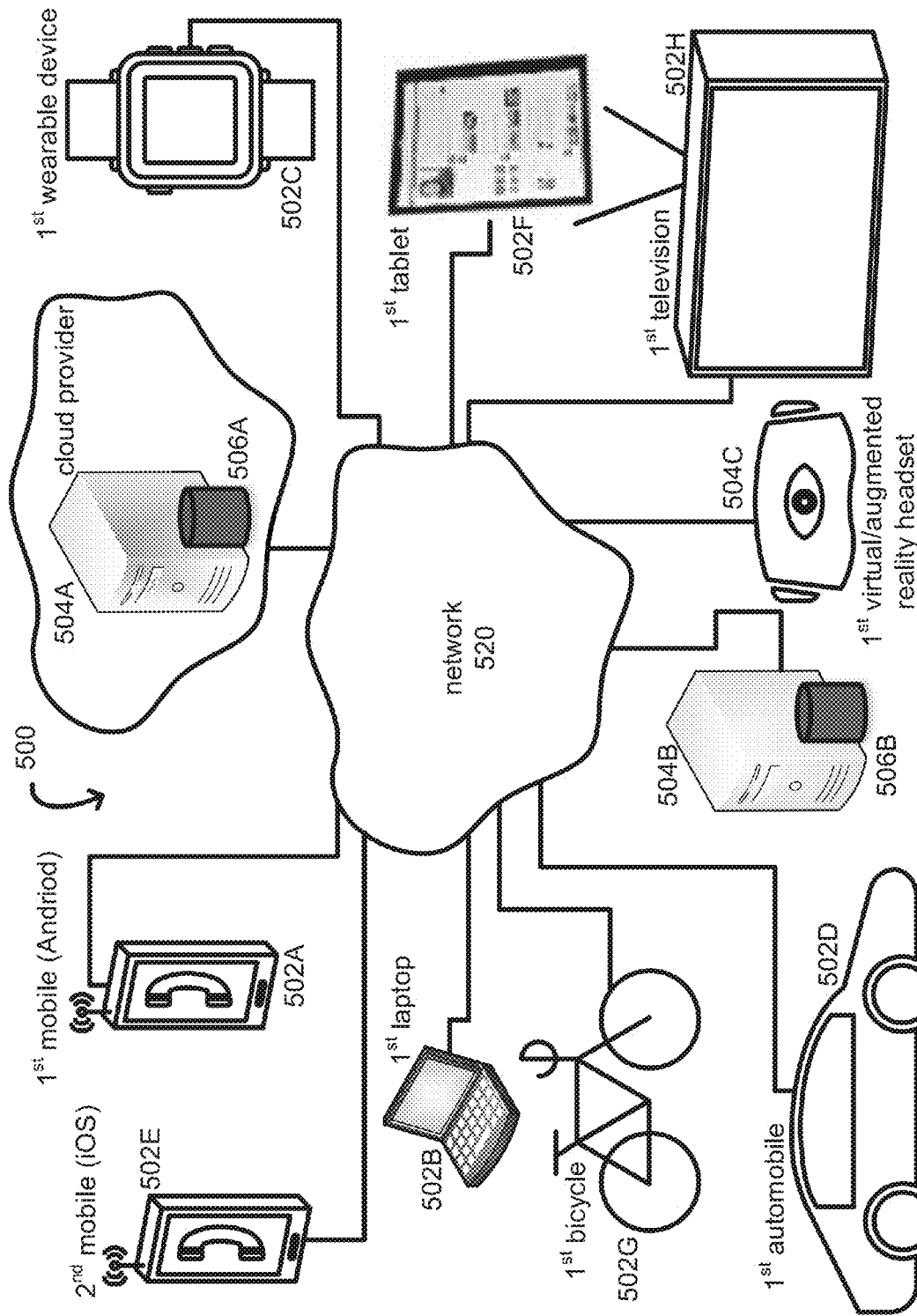

FIG. 5 provides one or more networks in accordance with some embodiments.

Figure 6:
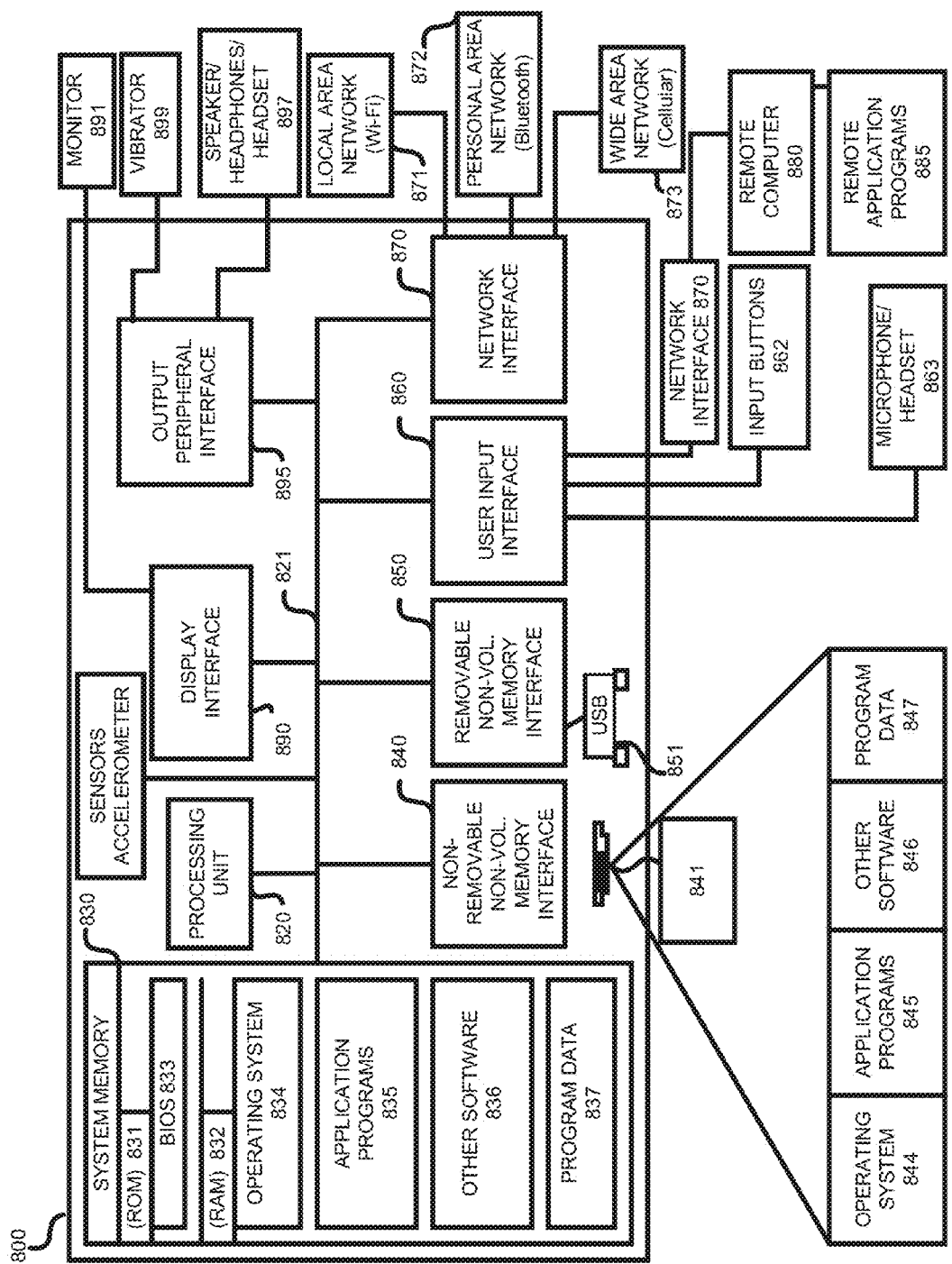

FIG. 6 provides one or more computing systems in accordance with some embodiments.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of memories in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first notification, can be made. However, the specific numeric reference should not be interpreted as a literal sequential order but rather interpreted that the first notification is different than a second notification. Thus, the specific details set forth are merely exemplary. The specific details can be varied from and still be contemplated to be within the spirit and scope of the present design. The term coupled is defined as meaning connected either directly to the component or indirectly to the component through another component.

Unless defined otherwise, all technical and scientific terms used herein have the same meaning as commonly understood by persons of ordinary skill in the art.

Users of electronic devices often have multiple electronic devices. For example, users often have two or more electronic devices selected from smart phones, tablet computers, personal computers, smart bicycles, virtual or augmented reality headsets, smart vehicles, and the like. Users of the foregoing electronic devices also increasingly use their electronic devices to consume entertainment content. Provided herein are systems and methods that address consuming entertainment content across multiple devices.

In some embodiments, for example, a system and a method is provided including a first client-entertainment module of a first mobile-computing device and a first client-entertainment profile associated with the first client-entertainment module. The first client-entertainment module can be configured to cooperate with i) a server-entertainment module on a server computer or ii) a second client-entertainment module on a second mobile-computing device to provide a seamless continuation of entertainment content at a specific point in the entertainment content on the second mobile-computing device. The first client-entertainment profile can be configured to track user interaction with entertainment content and features thereof to provide the specific point for the seamless continuation of the entertainment content. The first client-entertainment module can be configured to communicate with the server entertainment module and the second client-entertainment module to respectively update a server entertainment profile and a second client-entertainment profile in accordance with the first client-entertainment profile.

FIG. 1A provides a schematic illustrating a seamless continuation of entertainment content between a first and a second electronic device in accordance with some embodiments.

As shown, a system 100A for the seamless continuation of the entertainment content can include a first mobile-computing device 102 as the first electronic device and a second mobile-computing device 104 as the second electronic device. A user of the first mobile-computing device 102 can seamlessly continue entertainment content on the second mobile-computing device 104 through one or more server computers 106. While FIG. 1A illustrates mobile-computing devices, it should be understood that seamlessly continuing entertainment content can be accomplished on any two or more electronic devices selected from smart phones, phablets, tablet computers, personal computers, smart televisions, smart devices or systems incorporated into smart automobiles and smart bicycles, and the like. It should be further understood that the any two or more electronic devices can have the same or different operating systems, provided the electronic devices are configured as described in some embodiments herein. Furthermore, while FIG. 1A illustrates a video such as a movie as the entertainment content, the entertainment content can also include audio such as music or a game such as a video game. Moreover, while FIG. 1A illustrates seamlessly continuing a video on the second mobile-computing device 104 by pausing the video on the first mobile-computing device 102 and subsequently playing the video on the second mobile-computing device 104, it should be understood that any one of a number of playback controls including, but not limited to, forward skipping, forward seeking, playing, pausing, stopping, backward skipping, and backward seeking, can be used on the second electronic device (e.g., the second mobile-computing device 104) to seamlessly continue the entertainment content on the second electronic device.

As described in further detail herein, the foregoing can be accomplished by a first client-entertainment module of an electronic device such as the first mobile-computing device 102 configured to cooperate with a server-entertainment module on a server computer. In turn, the server-entertainment module can be configured to cooperate with a second client-entertainment module on a second electronic device such as the second mobile-computing device 104 to provide a seamless continuation of the entertainment content at a point in the entertainment content on the second electronic device. A first client-entertainment profile can be associated with the first client-entertainment module, and the first client-entertainment profile can be configured to track user interaction with the entertainment content and features thereof. The first client-entertainment profile can be used to update (e.g., merge with) a corresponding server entertainment profile for the user associated with the server-entertainment module. In turn, the server-entertainment profile can be used to update (e.g., merge with) a second client-entertainment profile associated with the second client-entertainment module. Since the second client-entertainment profile is, in effect, also updated (e.g., merged with) the first client-entertainment profile used track user interaction with the entertainment content and features thereof, the second client-entertainment module on a second electronic device can provide the seamless continuation of the entertainment content at a point in the entertainment content on the second electronic device.

As shown in FIG. 1A, the first mobile-computing device 102 and the second mobile-computing device 104 can each communicate with the one or more server computers 106 in a wide area network ("WAN") using a WPAN technology selected from Wi-Fi, a cellular communication network, and the like. As such, the first client-entertainment module can be configured to periodically transmit the first client-entertainment profile or portions thereof to the server entertainment module to update the server entertainment profile. Likewise, the second client-entertainment module can be configured to periodically transmit the second client-entertainment profile or portions thereof to the server entertainment module to update the server entertainment profile. Upon a request from either the first client-entertainment module or the second client-entertainment module, the server entertainment module can provide an update to the client-entertainment profile associated with the corresponding client-entertainment module, thereby enabling the seamless continuation of the entertainment content through the corresponding client-entertainment module at the point in the entertainment content.

FIG. 1B provides a schematic illustrating a seamless continuation of entertainment content between a first and a second electronic device in accordance with some embodiments.

As shown, a system 100B for the seamless continuation of the entertainment content can include the same first mobile-computing device 102 of FIG. 1A as the first electronic device and the same second mobile-computing device 104 of FIG. 1A as the second electronic device. In addition to that described in reference to FIG. 1A, the user of the first mobile-computing device 102 can seamlessly continue entertainment content on the second mobile-computing device 104 through a direct communication between the first mobile-computing device 102 and the second mobile-computing device 104.

As described in further detail herein, the foregoing can be accomplished by cooperation between the first client-entertainment module of the first mobile-computing device 102 (or any appropriately configured first electronic device) the second client-entertainment module on the second mobile-computing device 104 (or any appropriately configured first electronic device) to provide a seamless continuation of the entertainment content at a point in the entertainment content on the second mobile-computing device 104. A first client-entertainment profile can be associated with the first client-entertainment module, and the first client-entertainment profile can be configured to track user interaction with the entertainment content and features thereof. The first client-entertainment profile can be used to update (e.g., merge with) a second client-entertainment profile associated with the second client-entertainment module. Since the second client-entertainment profile is updated (e.g., merged with) the first client-entertainment profile used track user interaction with the entertainment content and features thereof, the second client-entertainment module on a second electronic device can provide the seamless continuation of the entertainment content at a point in the entertainment content on the second electronic device.

As shown in FIG. 1B, the first mobile-computing device 102 and the second mobile-computing device 104 can communicate with each other in a wireless personal area network ("WPAN") using a WPAN technology selected from near-field communications (NFC), Bluetooth®, Bluetooth® low-energy, ANT™, ANT+™, ZigBee®, RF4CE™, IrDA®, and the like. As such, the first client-entertainment module can be configured to transmit the first client-entertainment profile or portions thereof to the second client-entertainment module to update the second client-entertainment profile, and, thereby, provide the seamless continuation of the entertainment content at a point in the entertainment content on the second mobile-computing device 104. Likewise, the second client-entertainment module can be configured to transmit the second client-entertainment profile or portions thereof to the first client-entertainment module to update the first client-entertainment profile, and, thereby, provide the seamless continuation of the entertainment content at a point in the entertainment content on the first mobile-computing device 102.

With respect to the point in the entertainment content at which the entertainment content can be continued on the first or second electronic device, the point can be a time point in an audio-entertainment content or a video-entertainment content. The point can also be a time point in game time of a video game-entertainment content, wherein an associated client-entertainment profile can include any one or more video game-entertainment-content features at the time point in the game time selected from i-frame content, b-frame content, p-frame content, frame rate, frame rate-independent movement, frame rate-dependent movement, physics-based movement, and non-physics based movement.

FIG. 2A provides a schematic illustrating an electronic device including a client-entertainment module, a client-entertainment profile, and a number of entertainment applications in accordance with some embodiments.

As shown, the electronic device can include the same first mobile-computing device 102 of FIG. 1A as the first electronic device, a client-entertainment module 212 as the first client-entertainment module, and a client-entertainment profile 214 as the first client-entertainment profile. In addition, the electronic device can include a number of entertainment applications including, but not limited to, a first entertainment application 222 (e.g., a video application), a second entertainment application 224 (e.g., an audio application), a third entertainment application 226 (e.g., a game application), and any of a number of other entertainment applications represented by an $n^{th}$ entertainment application 228 (e.g., a multi-media application, etc.).

The client-entertainment module 212 can be configured to cooperate with the number of entertainment applications and the client-entertainment profile 214, as well as to transmit (e.g., through a communications interface, optionally in cooperation with a communications module) the client-entertainment profile 214 or portions thereof to another entertainment module (e.g., server- or client-entertainment module) to update a corresponding entertainment profile (e.g., server- or client-entertainment profile). The client-entertainment module 212 can be configured to directly interface with any one or more of the number of entertainment applications through an application programming interface ("API") to track user interactions with entertainment content and features thereof and to provide the user interactions and the features of the entertainment content to the client-entertainment profile 214 for collection therein. The client-entertainment module 212 can be configured to similarly directly interface with any one or more of the number of entertainment applications through a plugin for the any one or more of the number of entertainment applications.

In an example of the foregoing, the client-entertainment module 212 can be configured to directly interface with the first entertainment application 222 (e.g., a video application) through an API or a plugin to track user interactions (e.g., pause) with entertainment content and features (e.g., time point of pause in the video content) thereof and to provide the user interactions and the features of the entertainment content to the client-entertainment profile 214 for collection therein. Likewise, the client-entertainment module 212 can be configured to directly interface with the second entertainment application 224 (e.g., an audio application) through an API or a plugin to track user interactions (e.g., pause) with entertainment content and features (e.g., time point of pause in the audio content) thereof and to provide the user interactions and the features of the entertainment content to the client-entertainment profile 214 for collection therein. The client-entertainment module 212 can subsequently transmit the client-entertainment profile 214 or portions thereof to another entertainment module (e.g., server- or client-entertainment module) to update a corresponding entertainment profile (e.g., server- or client-entertainment profile) to the time point for the seamless continuation of the video or audio content.

In another example of the foregoing, the client-entertainment module 212 can be configured to directly interface with the third entertainment application 226 (e.g., a game application) through an API or a plugin to track user interactions (e.g., pause) with entertainment content and features thereof and to provide the user interactions and the features of the entertainment content to the client-entertainment profile 214 for collection therein. As provided herein, the features of the entertainment content such as a game can include time point in game time, i-frame content, b-frame content, p-frame content, frame rate, frame rate-independent movement, frame rate-dependent movement, physics-based movement, non-physics based movement, or any combination thereof. The client-entertainment module 212 can subsequently transmit the client-entertainment profile 214 or portions thereof to another entertainment module (e.g., server- or client-entertainment module) to update a corresponding entertainment profile (e.g., server- or client-entertainment profile) to the time point for the seamless continuation of the game content.

FIG. 2B provides a schematic illustrating an electronic device including a client-entertainment companion application including a client-entertainment module and a client-entertainment profile, as well as a number of entertainment applications in accordance with some embodiments.

As shown, the electronic device can include the same first mobile-computing device 102 of FIG. 1A as the first electronic device and a client-entertainment companion application 210 installed in one or more memories thereof. The client-entertainment companion application 210 can include the client-entertainment module 212 of FIG. 2A as the first client-entertainment module and the client-entertainment profile 214 of FIG. 2A as the first client-entertainment profile. In addition, the electronic device can include the number of entertainment applications described in reference to FIG. 2A including, but not limited to, the first entertainment application 222 (e.g., a video application), the second entertainment application 224 (e.g., an audio application), the third entertainment application 226 (e.g., a game application), and any of the number of other entertainment applications represented by an $n^{th}$ entertainment application 228 (e.g., a multi-media application, etc.).

FIG. 3A provides a schematic illustrating an electronic device including a client-entertainment module, a client-entertainment profile, and a client-entertainment application including a number of entertainment-content modules in accordance with some embodiments.

As shown, the electronic device can include the same first mobile-computing device 102 of FIG. 1A as the first electronic device, a client-entertainment module 212 as the first client-entertainment module, and a client-entertainment profile 214 as the first client-entertainment profile. In addition, the electronic device can include a client-entertainment application 330, which, in turn, can include a number of entertainment-content modules including, but not limited to, a first entertainment-content module 332 (e.g., a video module), a second entertainment-content module 334 (e.g., an audio module), a third entertainment-content module 336 (e.g., a game module), and any of a number of other entertainment-content modules represented by an $n^{th}$ entertainment-content module 338 (e.g., a multi-media module, etc.).

The client-entertainment application 330 can be configured to communicate with a server-entertainment system 460 (FIG. 4B) of the one or more server computers 106 to stream entertainment content from the one or more server computers 106 to the corresponding electronic device on which the client-entertainment application 330 is installed (e.g., the first mobile-computing device 102 of FIG. 1A). The client-entertainment application 330 can be configured to communicate through the client-entertainment module 212, a communications interface, optionally in cooperation with a communications module, or a combination thereof. When streaming content from the one or more server computers 106 to the corresponding electronic device on which the client-entertainment application 330 is installed, the first entertainment-content module 332 (e.g., a video module) of the client-entertainment application 330 can stream video-entertainment content from a corresponding first entertainment-content module 472 (FIG. 4B) of the server-entertainment system 460. Likewise, the second entertainment-content module 334 (e.g., an audio module) of the client-entertainment application 330 can stream audio-entertainment content from a corresponding second entertainment-content module 474 (FIG. 4B) of the server-entertainment system 460. In a similar way, the third entertainment-content module 336 (e.g., a game module) of the client-entertainment application 330 can stream game-entertainment content from a corresponding third entertainment-content module 476 (FIG. 4B) of the server-entertainment system 460, and so on for the $n^{th}$ entertainment-content module 338 (e.g., a multi-media module, etc.).

The client-entertainment module 212 can be configured to cooperate with the number of entertainment-content modules and the client-entertainment profile 214, as well as to transmit (e.g., through a communications interface, optionally in cooperation with a communications module) the client-entertainment profile 214 or portions thereof to another entertainment module (e.g., server- or client-entertainment module) to update a corresponding entertainment profile (e.g., server- or client-entertainment profile). The client-entertainment module 212 can be configured to directly interface with the client-entertainment application 330 through an API to track user interactions with entertainment content and features thereof and to provide the user interactions and the features of the entertainment content to the client-entertainment profile 214 for collection therein. The client-entertainment module 212 can be configured to similarly directly interface with the client-entertainment application 330 through a plugin for the client-entertainment application 330.

In an example of the foregoing, the client-entertainment module 212 can be configured to directly interface with the client-entertainment application 330 and an active entertainment-content module thereof such as the first entertainment-content module 332 (e.g., a video module) through an API or a plugin to track user interactions (e.g., pause) with entertainment content and features (e.g., time point of pause in the video content) thereof and to provide the user interactions and the features of the entertainment content to the client-entertainment profile 214 for collection therein. Likewise, the client-entertainment module 212 can be configured to directly interface with the client-entertainment application 330 and an active entertainment-content module thereof such as the second entertainment-content module 334 (e.g., an audio module) through an API or a plugin to track user interactions (e.g., pause) with entertainment content and features (e.g., time point of pause in the audio content) thereof and to provide the user interactions and the features of the entertainment content to the client-entertainment profile 214 for collection therein. The client-entertainment module 212 can subsequently transmit the client-entertainment profile 214 or portions thereof to another entertainment module (e.g., server- or client-entertainment module) to update a corresponding entertainment profile (e.g., server- or client-entertainment profile) to the time point for the seamless continuation of the video or audio content. The client-entertainment profile 214 remains important in such embodiments because it can reflect a true time point for the seamless continuation of the video or audio content instead of a buffer endpoint for the video or audio content.

In another example of the foregoing, the client-entertainment module 212 can be configured to directly interface with the client-entertainment application 330 and an active entertainment-content module thereof such as the third entertainment-content module 336 (e.g., a game module) through an API or a plugin to track user interactions (e.g., pause) with entertainment content and features thereof and to provide the user interactions and the features of the entertainment content to the client-entertainment profile 214 for collection therein. As provided herein, the features of the entertainment content such as a game can include time point in game time, i-frame content, b-frame content, p-frame content, frame rate, frame rate-independent movement, frame rate-dependent movement, physics-based movement, non-physics based movement, or any combination thereof. The client-entertainment module 212 can subsequently transmit the client-entertainment profile 214 or portions thereof to another entertainment module (e.g., server- or client-entertainment module) to update a corresponding entertainment profile (e.g., server- or client-entertainment profile) to the time point for the seamless continuation of the game content. The client-entertainment profile 214 remains important in such embodiments because it can reflect a true time point for the seamless continuation of the game content instead of a buffer endpoint for the game content.

FIG. 3B provides a schematic illustrating an electronic device including a client-entertainment application including a client-entertainment module, a client-entertainment profile, and a number of entertainment-content modules in accordance with some embodiments.

As shown, the electronic device can include the same first mobile-computing device 102 of FIG. 1A as the first electronic device and a client-entertainment application 330 installed in one or more memories thereof. The client-entertainment application 330 can include the client-entertainment module 212 of FIG. 3A as the first client-entertainment module and the client-entertainment profile 214 of FIG. 3A as the first client-entertainment profile. In addition, the client-entertainment application 330 can include the number of entertainment-content modules described in reference to FIG. 3A including, but not limited to, the first entertainment-content module 332 (e.g., a video module), the second entertainment-content module 334 (e.g., an audio module), the third entertainment-content module 336 (e.g., a game module), and any of the number of other entertainment-content modules represented by an $n^{th}$ entertainment-content module 338 (e.g., a multi-media module, etc.).

While primarily described in reference to the first mobile-computing device 102, it should be understood the electronic device described in reference to FIGS. 2A, 2B, 3A, and 3B, can instead be a phablet, a tablet computer, a personal computer, a smart television, a smart device or system incorporated into a smart automobile or a smart bicycle, or the like. Furthermore, the electronic device can include one or more configurations described in reference to FIGS. 2A, 2B, 3A, and 3B. In an example, the electronic device can include only the client-entertainment application 210 and the number of entertainment applications (e.g., the video application; the audio application; the game application; etc.) of FIG. 2B. In another example, the electronic device can include both the client-entertainment companion application 210 and the number of entertainment applications (e.g., the video application; the audio application; the game application; etc.) of FIG. 2B and the client-entertainment application 330 including the number of entertainment-content modules (e.g., the video module; the audio module; the game module; etc.) of FIG. 3B.

FIG. 4A provides a schematic illustrating one or more server computers including a server-entertainment system including a server-entertainment module and a number of user entertainment profiles in accordance with some embodiments.

As shown, the one or more server computers can include the same one or more server computers 106 of FIG. 1A as the one or more server computers. The one or more server computers 106 can include a server-entertainment system 460 including a server-entertainment module 462 and a number of server-side user profiles. The number of server-side user profiles can include a first user profile 463, a second user profile 465, a third user profile 467, and any of a number of other user profiles represented by an $n^{th}$ user profile 469.

The server-entertainment module 462 can be configured to cooperate with the number of server-side user profiles, as well as to transmit (e.g., through a communications interface, optionally in cooperation with a communications module) any one or more of the server-side user profiles or portions thereof to another entertainment module (e.g., client-entertainment module) to update a corresponding entertainment profile (e.g., client-entertainment profile).

The number of server-side user profiles can correspond to a number of client-entertainment profiles in a one-to-one relationship or a one-to-many relationship. In an example of a one-to-one relationship, the first user profile 463 can correspond to the first client-entertainment profile provided herein. In such an example, the user might only have a single electronic device such as the first mobile-computing device 102, and the first client-entertainment profile can be used to periodically update (e.g., merge with) the first user profile 463 with new user interactions and features of the entertainment content from the first mobile-computing device 102. In an example of a one-to-many relationship, the first user profile 463 can correspond to the first client-entertainment profile, and the first user profile 463 can also correspond to the second client-entertainment profile provided herein. In such an example, the user might have two electronic devices such as the first mobile-computing device 102 and the second mobile-computing device 104, and the first or second client-entertainment profile can be used to periodically update (e.g., merge with) the first user profile 463 with new user interactions and features of the entertainment content respectively from the first mobile-computing device 102 or the second mobile-computing device. The first user profile 463 can be used, in turn, to periodically update (e.g., merge with) the other of the first or second client-entertainment profile with the new user interactions and features of the entertainment content respectively on the first mobile-computing device 102 or the second mobile-computing device.

FIG. 4B provides a schematic illustrating one or more server computers including a server-entertainment system including a server-entertainment module, a number of user entertainment profiles, and a number of entertainment-content modules in accordance with some embodiments.

As shown, the one or more server computers can include the same one or more server computers 106 of FIG. 1A as the one or more server computers. The one or more server computers 106 can include a server-entertainment system 460 including the server-entertainment module 462 of FIG. 4A and the number of server-side user profiles of FIG. 4A. In addition, the server-entertainment system 460 can include a number of server-side entertainment-content modules including, but not limited to, a first entertainment-content module 472 (e.g., a video module), a second entertainment-content module 474 (e.g., an audio module), a third entertainment-content module 476 (e.g., a game module), and any of a number of other server-side entertainment-content modules represented by an $n^{th}$ entertainment-content module 478 (e.g., a multi-media module, etc.).

The server-entertainment system 460 of the one or more server computers 106 can be configured to communicate with the client-entertainment application 330 (FIGS. 3A and 3B) to provide entertainment content from the one or more server computers 106 to the corresponding electronic device on which the client-entertainment application 330 is installed (e.g., the first mobile-computing device 102 of FIG. 1A). The server-entertainment system 460 can be configured to communicate through the server-entertainment module 462, a communications interface, optionally in cooperation with a communications module, or a combination thereof. When providing content from the one or more server computers 106 to the corresponding electronic device on which the client-entertainment application 330 is installed, the first entertainment-content module 472 (e.g., a video module) of the server-entertainment system 460 can provide video-entertainment content to a corresponding first entertainment-content module (e.g., the first entertainment-content module 332 of FIGS. 3A and 3B) of the client-entertainment application 330. Likewise, the second entertainment-content module 474 (e.g., an audio module) of the server-entertainment system 460 can provide audio-entertainment content to a corresponding second entertainment-content module (e.g., the second entertainment-content module 334 of FIGS. 3A and 3B) of the client-entertainment application 330. In a similar way, the third entertainment-content module 476 (e.g., a game module) of the server-entertainment system 460 can provide game-entertainment content to a corresponding third entertainment-content module (e.g., the third entertainment-content module 336 of FIGS. 3A and 3B) of the client-entertainment application 330, and so on for the $n^{th}$ entertainment-content module 478.

In view of the foregoing, additional features in accordance with some embodiments of the foregoing systems and methods will now be described.

The context and data of where a user is in a game application, a video file-watching application, or a music-playing application can all be saved and then transferred from one device to another so that the user picks up exactly where the user paused and left off.

In some embodiments, a centralized server has the applications resident on the centralized server. A client on each of the different device platforms to acts as a dumb terminal to display the application. The client application is configured to collect and track the latest data and content of where the user is in the game or video or music and push that data actively to the centralized server.

The centralized server can have a lot of capacity and space to store instances of each application that the user has in order for those instances to work with multiple, such as up to three different operating systems, wherein each application instance is configured to work with a particular operating system corresponding to a different device platform if the different device platform uses a different operating system. For example, an Android™ smart television and an Android™ smart phone most likely use the same operating system. However, an Android™ smart television and an iPhone® would most likely not be using the same operating system, which is a reason for multiple instances of the application configured to use using different operating systems.

In a general sense, the centralized server can have the applications and is figuring out the content and sending the content to the different devices such as a smart phone, a smart television, a laptop, an automobile-interactive console or entertainment system, or an bicycle-interactive console or entertainment system. The centralized server generally knows which application is running and what content and where about in that content the user is at the current time since. Normally there is a slight delay between the generation of the content at the server and the display of that content on the application in the dumb terminal of the different device platforms.

An algorithm for software can capture the pause and the frame in order to be able to re-create everything in that frame rendered in the condition that was left by the user when the user paused the application on one device platform and then transferred over to another device platform.

When that happens, the second device will come up with a user interface and ask the user if he or she would like to resume one or more of the paused applications or stopped applications that have been tracked by the centralized server.

When the user chooses to relaunch the paused or stopped application, then the centralized server can simply resume and relaunch from the saved content and saved frame for that particular user. For most music and audio files, the exact time frame and frame of where the user stopped his or her pause can be easily noted and conveyed.

For game applications, where and which level the user is at, and what nonplaying characters and other actions that are going on can be stored as data. The current condition of the user can be stored, and then this data can be used in order to relaunch and resume from the point where the player left off.

Multiple instances of all the applications that the user uses can be stored in the cloud on the server, and then a routine can save the last data and content less what has occurred in each of the applications that is currently being played by the user on a first device platform or on a second device platform.

In view of the foregoing, the applications can be resident in the server in the cloud.

The data and content stored in the cloud of where the user currently is in the applications being used. This data and content can be pushed periodically into the cloud by the client application on the dumb terminal of the different device platforms. Each cloud platform can have a very large database and a lot of memory storage for each user.

On each different device platform, an icon of a shortcut to an executable file stored in the cloud to start an application can be stored that the user can tap on the icon to launch that application. The client application resident in the mobile device can act to track and store what they just did with content of the active applications and periodically push that information to the centralized server. When the user pauses an application such as a video on the clock, the first client device can then track the exact frame of where the user is on the music being played or the video file being played and transfer it to the cloud.

When the client then opens up a second device such as his car or a laptop or smart television in the client he or she can be presented the option to resume the paused application.

The server can launch the application that is proper to work with the operating system on the new device and then resume the action on the application by using the saved content and data and frame number and timecode if applicable.

The client devices different device platforms make them buffer and build up a small queue of content for to be played on that device in order to eliminate jitter and other visual effects.

In view of the foregoing, the applications are not resident in the mobile devices in this environment just resident in the centralized server.

The server relaunches the appropriate application to work with the operating system on the client device currently playing the content and then feeds in the content and data that was stored of where the user was in that application such as where they were in a game or what frame in time they were at in a music song being played or a video file being played.

The saved data about the user is stored in an encrypted state for security reasons. Either HTTPS or a secure tunnel is used to establish communications between the centralized server and the different device platforms.

The smart client application on the device platform can monitor and save the users' interaction with a particular application and then transfer that information of the users' interaction to the centralized server, which is then replicated and seamlessly shown on another device platform.

The technical field of invention is client-server communications in some embodiments.

Some embodiments seamlessly allows similar interactions for content applications across the ecosystem of different device platforms to be seamlessly transferred between these different device platforms of a smart phone, automobile entertainment system, bicycle entertainment system, smart televisions, virtual or augmented reality headsets, laptops, tablets, and the like.

Instances of the client applications can be installed on the multiple different device platforms such as the car phone and the smart television, and each instance of the client can be customized to work with a car and it's operating system, a phone and it's operating system, and a television and it's operating system.

The centralized server can maintain a set of APIs to reconfigure and to put data and information in the different device operating systems and applications written for those different devices. In this way, the centralized server can re-create and restore the same content and same place of where the user was when the user paused the application.

The client application on the application specific devices can save the users' interactions and store those and actions and the current state of the different applications and the variables. The client application can then push that information periodically to be stored in the cloud in a database cooperating with the server farm.

The server farm can actively pool this information from each client device out there. In some embodiments, the client device is active and the client application actively pushes this information to the cloud and the server farm.

When an icon shortcut is depressed the client application can then pull down the appropriate application or just cause launching of that appropriate application on the server and then have a cooperating application resident on the mobile phone to display the information coming from the server.

Users' interactions can then be transferred between different device platforms by the centralize server.

The client application can monitor user interaction on the different device platforms and store that information. Periodically, the client application can send that information to the cloud, and then, via using the users profile, seamlessly transfer the current state and the users' interactions with an application to a second or even a third different device platform and allow the user to pick up where they left off on that application.

This makes the transfer of information seamless for the different operating systems and different devices out there in the marketplace.

Users' profiles can based on who logs in to the different device platforms.

A large cache can be used to store the state data and frame data from the application to be re-created or restored where the user was. The data can be stored both in the local device and then pushed to the server, and the server can store that information in order re-create or restore where the user was in case the user fast forwards or pauses or stops where they are in the application.

Using his or her face opens up and shows the user what applications are currently paused or otherwise active.

A user can be playing a game on a smart television or on his or her laptop and pause where they are and then resume that game on his or her mobile phone.

In some embodiments, intelligent applications can run on each of the different device platforms. The client application can still track and store where the user is on the active applications running. When the user is close enough to another device platform with a client application on that device platform, then the two client applications can communicate via near-field communication or Bluetooth communication to pass the stored content and context and frame information of where the user is an active application. Thus, two client applications can physically transfer and pass users' interaction state data between the two client applications. When the user starts the second device, then the user interface pops up for all the active applications should the user wish to resume an application. If so, then the client application and intelligent applications on the different devices relaunch the appropriate corresponding application and then re-create from the saved content where the user is in a music file, video file, or game application.

The frame number and time can be transferred for the video or audio files, as well as transferred with the level of the game where the user was in the state of the creatures in the frame.

In some embodiments, the centralized server include APIs in order to map where the data should be for the different operating systems and the different applications on the different operating systems in order to transfer the content and state data between the different devices with different operating systems.

Seamless transfer of control buttons (e.g., play, pause, FF, REW, etc.), also called trick mode buttons, of any content across various device types like smart phone, smart television, smart automotive devices, and smart bicycle devices. For example, if you are playing a video at home on your smart television and pause it; get in your smart car and are parked, waiting to pick someone up; you can play the video on your smart car. You can finish the video and then pick another. Then you can pause it, leave it, and go inside a building. You are able to un-pause the video from your phone. This goes across multiple networks as well. It involves being aware and using a user profile.

Network

FIG. 5 illustrates a number of electronic systems and devices communicating with each other in a network environment in accordance with some embodiments. The network environment 500 has a communications network 520. The network 520 can include one or more networks selected from an optical network, a cellular network, the Internet, a Local Area Network (LAN), a Wide Area Network (WAN), a satellite network, a fiber network, a cable network, and a combinations thereof. In some embodiments, the communications network 520 is the Internet. As shown, there may be many server computing systems and many client computing systems connected to each other via the communications network 520. However, it should be appreciated that, for example, a single client computing system can also be connected to a single server computing system. As such, FIG. 5 illustrates any combination of server computing systems and client computing systems connected to each other via the communications network 520.

The communications network 520 can connect one or more server computing systems selected from at least a first server computing system 504A and a second server computing system 504B to each other and to at least one or more client computing systems as well. The server computing systems 504A and 504B can respectively optionally include organized data structures such as databases 506A and 506B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 502A (e.g., smartphone with an Android-based operating system), a second mobile computing device 502E (e.g., smartphone with an iOS-based operating system), a first wearable electronic device 502C (e.g., a smartwatch), a first portable computer 502B (e.g., laptop computer), a third mobile computing device or second portable computer 502F (e.g., tablet with an Android- or iOS-based operating system), a smart device or system incorporated into a first smart automobile 502D, a smart device or system incorporated into a first smart bicycle 502G, a first smart television 502H, a first virtual reality or augmented reality headset 504C, and the like. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first mobile computing device 502A (e.g., the client computing system) and the server computing system 504A can both initiate and respond to communications, their communications can be viewed as peer-to-peer. Likewise, communications between the one or more server computing systems (e.g., server computing systems 504A and 504B) and the one or more client computing systems (e.g., client computing systems 502A and 502C) can be viewed as peer-to-peer if each is capable of initiating and responding to communications. Additionally, the server computing systems 504A and 504B include circuitry and software enabling communication with each other across the network 520.

Any one or more of the server computing systems can be a cloud provider. A cloud provider can install and operate application software in a cloud (e.g., the network 520 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol (HTTP), to engage in a request and response cycle with an application on a client computing system such as a mobile computing device application resident on the mobile computing device as well as a web-browser application resident on the mobile computing device. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) SMS/twitter-based requests and responses message exchanges, 3) the request and response cycle from a dedicated on-line server, 4) the request and response cycle directly between a native mobile application resident on a client device and the cloud-based remote access to another client computing system, and 5) combinations of these.

In an embodiment, the server computing system 504A can include a server engine, a web page management component, a content management component, and a database management component. The server engine can perform basic processing and operating system level tasks. The web page management component can handle creation and display or routing of web pages or screens associated with receiving and providing digital content and digital advertisements. Users (e.g., cloud users) can access one or more of the server computing systems by means of a Uniform Resource Locator (URL) associated therewith. The content management component can handle most of the functions in the embodiments described herein. The database management component can include storage and retrieval tasks with respect to the database, queries to the database, and storage of data.

An embodiment of a server computing system to display information, such as a web page, etc. is discussed. An application including any program modules, applications, services, processes, and other similar software executable when executed on, for example, the server computing system 504A, causes the server computing system 504A to display windows and user interface screens on a portion of a media space, such as a web page. A user via a browser from, for example, the client computing system 502A, can interact with the web page, and then supply input to the query/fields and/or service presented by a user interface of the application. The web page can be served by a web server, for example, the server computing system 504A, on any Hypertext Markup Language (HTML) or Wireless Access Protocol (WAP) enabled client computing system (e.g., the client computing system 502A) or any equivalent thereof. For example, the client mobile computing system 502A may be a wearable electronic device, smartphone, a tablet, a laptop, a netbook, etc. The client computing system 502A can host a browser, a mobile application, and/or a specific application to interact with the server computing system 504A. Each application has a code scripted to perform the functions that the software component is coded to carry out such as presenting fields and icons to take details of desired information. Algorithms, routines, and engines within, for example, the server computing system 504A can take the information from the presenting fields and icons and put that information into an appropriate storage medium such as a database (e.g., database 506A). A comparison wizard can be scripted to refer to a database and make use of such data. The applications may be hosted on, for example, the server computing system 504A and served to the browser of, for example, the client computing system 502A. The applications then serve pages that allow entry of details and further pages that allow entry of more details.

Computing Systems

FIG. 6 illustrates a computing system with components that can be part of one or more of the computing devices in accordance with some embodiments. With reference to FIG. 6, components of the computing system 800 may include, but are not limited to, a processing unit 820 having one or more processing cores, a system memory 830, and a system bus 821 that couples various system components including the system memory 830 to the processing unit 820. The system bus 821 may be any of several types of bus structures selected from a memory bus or memory controller, a peripheral bus, and a local bus using any of a variety of bus architectures.

Computing system 800 typically includes a variety of computing machine-readable media. Computing machine-readable media can be any available media that can be accessed by computing system 800 and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. Transitory media such as wireless channels are not included in the machine-readable media. Communication media typically embody computer readable instructions, data structures, other executable software, or other transport mechanism and includes any information delivery media. As an example, some client computing systems on the network 520 of FIG. 5 might not have optical or magnetic storage.

The system memory 830 includes computer storage media in the form of volatile and/or nonvolatile memory such as read only memory (ROM) 831 and random access memory (RAM) 832. A basic input/output system 833 (BIOS) containing the basic routines that help to transfer information between elements within the computing system 800, such as during start-up, is typically stored in ROM 831. RAM 832 typically contains data and/or software that are immediately accessible to and/or presently being operated on by the processing unit 820. By way of example, and not limitation, FIG. 6 illustrates that RAM 832 can include a portion of the operating system 834, application programs 835, other executable software 836, and program data 837.

The computing system 800 can also include other removable/non-removable volatile/nonvolatile computer storage media. By way of example only, FIG. 6 illustrates a solid-state memory 841. Other removable/non-removable, volatile/nonvolatile computer storage media that can be used in the example operating environment include, but are not limited to, USB drives and devices, flash memory cards, solid state RAM, solid state ROM, and the like. The solid-state memory 841 is typically connected to the system bus 821 through a non-removable memory interface such as interface 840, and USB drive 851 is typically connected to the system bus 821 by a removable memory interface, such as interface 850.

The drives and their associated computer storage media discussed above and illustrated in FIG. 6, provide storage of computer readable instructions, data structures, other executable software and other data for the computing system 800. In FIG. 6, for example, the solid state memory 841 is illustrated for storing operating system 844, application programs 845, other executable software 846, and program data 847. Note that these components can either be the same as or different from operating system 834, application programs 835, other executable software 836, and program data 837. Operating system 844, application programs 845, other executable software 846, and program data 847 are given different numbers here to illustrate that, at a minimum, they are different copies.

A user may enter commands and information into the computing system 800 through input devices such as a keyboard, touchscreen, or software or hardware input buttons 862, a microphone 863, a pointing device and/or scrolling input component, such as a mouse, trackball or touch pad. The microphone 863 can cooperate with speech recognition software. These and other input devices are often connected to the processing unit 820 through a user input interface 860 that is coupled to the system bus 821, but can be connected by other interface and bus structures, such as a parallel port, game port, or a universal serial bus (USB). A display monitor 891 or other type of display screen device is also connected to the system bus 821 via an interface, such as a display interface 890. In addition to the monitor 891, computing devices may also include other peripheral output devices such as speakers 897, a vibrator 899, and other output devices, which may be connected through an output peripheral interface 895.

The computing system 800 can operate in a networked environment using logical connections to one or more remote computers/client devices, such as a remote computing system 880. The remote computing system 880 can a personal computer, a hand-held device, a server, a router, a network PC, a peer device or other common network node, and typically includes many or all of the elements described above relative to the computing system 800. The logical connections depicted in FIG. 6 can include a personal area network (PAN) 872 (e.g., Bluetooth®), a local area network (LAN) 871 (e.g., Wi-Fi), and a wide area network (WAN) 873 (e.g., cellular network), but may also include other networks such as a personal area network (e.g., Bluetooth®). Such networking environments are commonplace in offices, enterprise-wide computer networks, intranets and the Internet. A browser application may be resident on the computing device and stored in the memory.

When used in a LAN networking environment, the computing system 800 is connected to the LAN 871 through a network interface or adapter 870, which can be, for example, a Bluetooth® or Wi-Fi adapter. When used in a WAN networking environment (e.g., Internet), the computing system 800 typically includes some means for establishing communications over the WAN 873. With respect to mobile telecommunication technologies, for example, a radio interface, which can be internal or external, can be connected to the system bus 821 via the network interface 870, or other appropriate mechanism. In a networked environment, other software depicted relative to the computing system 800, or portions thereof, may be stored in the remote memory storage device. By way of example, and not limitation, FIG. 6 illustrates remote application programs 885 as residing on remote computing device 880. It will be appreciated that the network connections shown are examples and other means of establishing a communications link between the computing devices may be used.

As discussed, the computing system 800 can include a processor 820, a memory (e.g., ROM 831, RAM 832, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 6. However, the present design can be carried out on a server, a computing device devoted to message handling, or on a distributed system in which different portions of the present design are carried out on different parts of the distributed computing system.

Another device that may be coupled to bus 821 is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

As such, provided herein in some embodiments is a system including a first client-entertainment module of a first mobile-computing device and a first client-entertainment profile associated with the first client-entertainment module. The first client-entertainment module can be configured to cooperate with components of the first mobile-computing device including one or more processors to execute instructions, one or more memories to store information, one or more data input components to receive data input from a user of the first mobile-computing device, a communications interface configured to establish a communications link for communications with other computing devices external to the first mobile-computing device, a display screen to display at least some of the information stored in the one or more memories, and a battery to provide battery power to the first mobile-computing device. At least a portion of the first client-entertainment module can be implemented in software stored in the one or more memories and executed by the one or more processors. The first client-entertainment module can be configured to cooperate with at least i) a server-entertainment module on a server computer or ii) a second client-entertainment module on a second mobile-computing device of the other computing devices to provide a seamless continuation of entertainment content at a specific point in the entertainment content on the second client-entertainment module on the second mobile-computing device. The first client-entertainment profile can be configured to track user interaction with entertainment content and features thereof to provide the specific point for the seamless continuation of the entertainment content. The first client-entertainment module can be configured to periodically communicate with the server entertainment module in a wide area network ("WAN") to update a server entertainment profile associated with the server entertainment module in accordance with the first client-entertainment profile, thereby enabling a server-based update to a second client-entertainment profile associated with the second client-entertainment module in accordance with the server entertainment profile for the seamless continuation of the entertainment content at the specific point in the entertainment content. The first client-entertainment module can be also configured to directly communicate with the second client-entertainment module in a wireless personal area network (WPAN) between the first mobile-computing device and the second mobile-computing device to update the second client-entertainment profile in accordance with the first client-entertainment profile, thereby enabling the seamless continuation of the entertainment content at the specific point in the entertainment content. In some embodiments, the specific point in the entertainment content can be a time point in an audio-entertainment content or a video-entertainment content. In some embodiments, the specific point in the entertainment content can be a time point in game time of a video game-entertainment content, and the first client-entertainment profile can include any one or more video game-entertainment-content features selected from i-frame content, b-frame content, p-frame content, frame rate, frame rate-independent movement, frame rate-dependent movement, physics-based movement, and non-physics based movement in the first client-entertainment profile for the time point in game time. In some embodiments, the WPAN can include WPAN technology selected from near-field communications (NFC), Bluetooth® low-energy, ANT™, ANT+™, ZigBee®, RF4CE™, and IrDA®. In some embodiments, the first and second mobile-computing device can be smartphones, and the other devices can include one or more smart devices selected from smartphones, phablets, tablets, smart televisions, smart devices incorporated in smart automobiles, and smart devices incorporated in smart bicycles. In some embodiments, the first client-entertainment module can be part of a first client entertainment-companion application installed on the first mobile-computing device, and the first client entertainment-companion application can be configured to cooperate with one or more entertainment applications installed on the first mobile-computing device selected from an audio-entertainment application, a video-entertainment application, and a video game-entertainment application to record a user-initiated pause in the entertainment content and provide a pause point as the specific point for the seamless continuation of the entertainment content. In some embodiments, the second client-entertainment module can be part of a second client entertainment-companion application installed on the second mobile-computing device, and the second client entertainment-companion application can be configured to cooperate with one or more entertainment applications installed on the second mobile-computing device selected from an audio-entertainment application, a video-entertainment application, and a video game-entertainment application to play the entertainment content from the pause point. In some embodiments, the first client-entertainment module can be part of a first client entertainment application installed on the first mobile-computing device, the first client entertainment application can be configured to stream entertainment content selected from audio-entertainment content, video-entertainment content, and video game-entertainment content from a server entertainment system installed on a server computer, and the first client entertainment-companion application can be also configured to record a user-initiated pause in the entertainment content and provide a pause point as the specific point for the seamless continuation of the entertainment content. In some embodiments, the server entertainment system can be also configured to record the user-initiated pause in the entertainment content and provide the pause point as the specific point for the seamless continuation of the entertainment content. In some embodiments, the second client-entertainment module can be part of a second client entertainment application installed on the second mobile-computing device, the second client entertainment application can be configured to stream entertainment content selected from audio-entertainment content, video-entertainment content, and video game-entertainment content from the server entertainment system, and the second client entertainment-companion application can be also configured to play the entertainment content from the pause point.

Also provided herein in some embodiments is a non-transitory machine-readable medium configured to store instructions and data that when executed by one or more processors on the foregoing first mobile computing device, causes the first mobile computing device to perform the operations including providing the first client-entertainment module of the first mobile-computing device; and providing the first client-entertainment profile associated with the first client-entertainment module.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A non-transitory machine-readable medium configured to store instructions and data that when executed by one or more processors on a first mobile computing device, causes the first mobile computing device to perform the following operations, comprising:
   providing a first client-entertainment module of the first mobile-computing device configured to
      1) monitor and capture a current context and data of an entertainment application selected from the group consisting of
         i) a game application,
         ii) a video-watching application, and
         iii) a music-playing application, that a user of the first mobile-computing device is actively using,
      2) store the current context and data in one or more memories as stored current context and data, and then
      3) periodically push the stored current context and data to transfer the stored current context and data from the first mobile-computing device to a second computing device so that the user picks up approximately where the user left off in the entertainment application after the user launches the entertainment application on the second computing device; and
   providing a first client-entertainment profile associated with the first client-entertainment module,
      wherein the first client-entertainment module is configured to cooperate with components of the first mobile-computing device including
         the one or more processors to execute instructions,
         the one or more memories to store the current context and data of the entertainment application,
         one or more data input components to receive data input from the user of the first mobile-computing device,
         a communications interface configured to establish a communications link for communications with other computing devices, including the second computing device, external to the first mobile-computing device,
         a display screen to display at least a portion of entertainment content of the entertainment application, and
         a battery to provide battery power to the first mobile-computing device,
      wherein when a portion of the first client-entertainment module is implemented in software, then the software is stored in the one or more memories and executed by the one or more processors, wherein the first client-entertainment module is configured to cooperate with second computing device selected from the group consisting of
  i) a server-entertainment module on a server computer,
  ii) a second client-entertainment module on the second computing device,
  iii) a third client-entertainment module on a non-mobile computing device, and
  iv) any combination of i), ii) and iii) to provide a seamless continuation of the entertainment content at approximately a same point in time in the entertainment content of the entertainment application after the user launches the entertainment application on the second computing device, wherein the first client-entertainment profile is configured to store stateful information of the user including use of the entertainment application by the user, and wherein the first client-entertainment module is configured, via the communications interface, to periodically communicate with the server entertainment module in a wide area network ("WAN") to update a server entertainment profile associated with the server entertainment module in accordance with the first client-entertainment profile, thereby enabling a server-based update to a second client-entertainment profile associated with the second client-entertainment module in accordance with the server entertainment profile for the user to pick up approximately where the user left off in the entertainment application after the user launches the entertainment application on the second computing device.

2. The non-transitory machine-readable medium of claim 1, wherein the first client-entertainment module is also configured to act as a content player, where a cloud platform with one or more servers cooperate with one or more databases to store and run multiple versions of at least one of the game application, the video-watching application, and the music-playing application, resident on the one or more servers, each of the multiple versions is configured to work with a particular operating system corresponding to a different device platform, and a corresponding client-entertainment module on each of the different device platforms is configured to act as the content player to display the entertainment content, where the corresponding client-entertainment module is configured to store content from the one or more servers in the one or more memories to create a buffer of the entertainment content to prevent jitter or lag on a corresponding display screen, where the first client-entertainment module is configured to cooperate with the operating system implemented in the first mobile-computing device, wherein the third client-entertainment module is configured to cooperate with the operating system implemented on a non-mobile computing device, where when the third client-entertainment module communicates with the one or more servers that an application requesting to be launched for the non-mobile computing device corresponding to a same application paused or stopped on the first mobile-computing device, then the server-entertainment module on the server computer i) launches the instance of the same application that cooperates with the operating system of the non-mobile computing device and ii) uses a last version of the stored current context and data pushed from the first client-entertainment module to seamlessly recreate the approximate point in time where the user left off in the entertainment application, and then feeds the instance of the same application with that current content to the third client-entertainment module to be played on the non-mobile computing device.

3. The non-transitory machine-readable medium of claim 1, wherein resuming at approximately the same point in time in the entertainment content of the entertainment application is a time point in game time of a video game-entertainment content, and wherein the current context and data includes any one or more video game-entertainment-content features selected from i-frame content, b-frame content, p-frame content, frame rate, frame rate-independent movement, frame rate-dependent movement, physics-based movement, and non-physics based movement in the first client-entertainment profile for the approximate time point in game time.

4. The non-transitory machine-readable medium of claim 1, wherein the first client-entertainment module is configured to periodically communicate with the server entertainment module in the WAN to update the server entertainment profile by requesting a merge of the first-client entertainment profile with the server entertainment profile, thereby enabling the server-based update to the second client-entertainment profile associated with the second client-entertainment module by requesting a merge of the server entertainment profile with the second client-entertainment profile.

5. The non-transitory machine-readable medium of claim 1, wherein the first client-entertainment module is also configured to directly communicate with the second client-entertainment module in a wireless personal area network ("WPAN") between the first mobile-computing device and the second computing device to update the second client-entertainment profile in accordance with the first client-entertainment profile, thereby enabling the user to pick up approximately where the user left off in the entertainment application after the user launches the entertainment application on the second computing device.

6. The non-transitory machine-readable medium of claim 1, wherein the first client-entertainment module is part of a first client entertainment-companion application installed on the first mobile-computing device, and wherein the first client entertainment-companion application is configured to cooperate with one or more entertainment applications installed on the first mobile-computing device selected from an audio-entertainment application, a video-entertainment application, and a video game-entertainment application to record a user-initiated pause in the entertainment content and provide a pause point as an approximate point for a seamless continuation of the entertainment content.

7. The non-transitory machine-readable medium of claim 6, wherein the second client-entertainment module is part of a second client entertainment-companion application installed on the second computing device, and wherein the second client entertainment-companion application is configured to cooperate with one or more entertainment applications installed on the second computing device selected from an audio-entertainment application, a video-entertainment application, and a video game-entertainment application to play the entertainment content from the pause point.

8. The non-transitory machine-readable medium of claim 1, wherein the first client-entertainment module is part of a first client entertainment application installed on the first mobile-computing device, wherein the first client entertainment application is configured to stream entertainment content selected from audio-entertainment content, video-entertainment content, and video game-entertainment content from a server entertainment application installed on the server computer, and wherein the first client entertainment-companion application is also configured to record a user-initiated pause in the entertainment content and provide a pause point as an approximate point for a seamless continuation of the entertainment content.

9. The non-transitory machine-readable medium of claim 8, wherein the server entertainment application is also configured to record the user-initiated pause in the entertainment content and provide the pause point as the approximate point for the seamless continuation of the entertainment content.

10. The non-transitory machine-readable medium of claim 8, wherein the second client-entertainment module is part of a second client entertainment application installed on the second computing device, wherein the second client entertainment application is configured to stream entertainment content selected from audio-entertainment content, video-entertainment content, and video game-entertainment content from the server entertainment application, and wherein the second client entertainment-companion application is also configured to play the entertainment content from the pause point.

11. A system, comprising:

a first client-entertainment module of the first mobile-computing device configured to 1) monitor and capture a current context and data of an entertainment application selected from the group consisting of
   i) a game application,
   ii) a video-watching application, and
   iii) a music-playing application, that a user of the first mobile-computing device is actively using, 2) store the current context and data in one or more memories as stored current context and data, and then 3) periodically push the stored current context and data to transfer the stored current context and data from the first mobile-computing device to a second computing device so that the user picks up approximately where the user left off in the entertainment application after the user launches the entertainment application on the second computing device; and a first client-entertainment profile associated with the first client-entertainment module, wherein the first client-entertainment module is configured to cooperate with components of the first mobile-computing device including
   the one or more processors to execute instructions,
   the one or more memories to store the current context and data of the entertainment application,
   one or more data input components to receive data input from the user of the first mobile-computing device,
   a communications interface configured to establish a communications link for communications with other computing devices, including the second computing device, external to the first mobile-computing device,
   a display screen to display at least a portion of entertainment content of the entertainment application, and
   a battery to provide battery power to the first mobile-computing device, wherein when a portion of the first client-entertainment module is implemented in software, then the software is stored in the one or more memories and executed by the one or more processors, wherein the first client-entertainment module is configured to cooperate with second computing device selected from the group consisting of
   i) a server-entertainment module on a server computer,
   ii) a second client-entertainment module on the second computing device,
   iii) a third client-entertainment module on a non-mobile computing device, and
   iv) any combination of i), ii) and iii) to provide a seamless continuation of the entertainment content at approximately a same point in time in the entertainment content of the entertainment application after the user launches the entertainment application on the second computing device, wherein the first client-entertainment profile is configured to store stateful information of the user including use of the entertainment application by the user, and wherein the first client-entertainment module is configured, via the communications interface, to periodically communicate with the server entertainment module in a wide area network ("WAN") to update a server entertainment profile associated with the server entertainment module in accordance with the first client-entertainment profile, thereby enabling a server-based update to a second client-entertainment profile associated with the second client-entertainment module in accordance with the server entertainment profile for the user to pick up approximately where the user left off in the entertainment application after the user launches the entertainment application on the second computing device.

12. The system of claim 11, wherein the first client-entertainment module is also configured to act as a content player, where a cloud platform with one or more servers cooperate with one or more databases to store and run multiple versions of the game application, the video-watching application, and the music-playing application resident on the one or more servers, each of the multiple versions is configured to work with a particular operating system corresponding to a different device platform, and a corresponding client-entertainment module on each of the different device platforms is configured to act as the content player to display the entertainment content, where the corresponding client-entertainment module is configured to store content from the one or more servers in the one or more memories to create a buffer of the entertainment content to prevent jitter or lag on a corresponding display screen, where the first client-entertainment module is configured to cooperate with the operating system implemented in the first mobile-computing device, wherein the third client-entertainment module is configured to cooperate with the operating system implemented on a non-mobile computing device, where when the third client-entertainment module communicates with the one or more servers that an application requesting to be launched for the non-mobile computing device corresponding to a same application paused or stopped on the first mobile-computing device, then the server-entertainment module on the server computer i) launches the instance of the same application that cooperates with the operating system of the non-mobile computing device and ii) uses a last version of the stored current context and data pushed from the first client-entertainment module to seamlessly recreate the approximate point in time where the user left off in the entertainment application, and then feeds the instance of the same application with that current content to the third client-entertainment module to be played on the non-mobile computing device.

13. The system of claim 11,
wherein resuming at approximately the same point in time in the entertainment content of the entertainment application is a time point in game time of a video game-entertainment content, and
wherein the current context and data includes any one or more video game-entertainment-content features selected from i-frame content, b-frame content, p-frame content, frame rate, frame rate-independent movement, frame rate-dependent movement, physics-based movement, and non-physics based movement in the first client-entertainment profile for the approximate time point in game time.

14. The system of claim 11,
wherein the first client-entertainment module is configured to periodically communicate with the server entertainment module in the WAN to update the server entertainment profile by requesting a merge of the first-client entertainment profile with the server entertainment profile, thereby enabling the server-based update to the second client-entertainment profile associated with the second client-entertainment module by requesting a merge of the server entertainment profile with the second client-entertainment profile.

15. The system of claim 11,
wherein the first client-entertainment module is also configured to directly communicate with the second client-entertainment module in a wireless personal area network ("WPAN") between the first mobile-computing device and the second computing device to update the second client-entertainment profile in accordance with the first client-entertainment profile, thereby enabling the user to pick up approximately where the user left off in the entertainment application after the user launches the entertainment application on the second computing device.

16. The system of claim 11,
wherein the first client-entertainment module is part of a first client entertainment-companion application installed on the first mobile-computing device, and
wherein the first client entertainment-companion application is configured to cooperate with one or more entertainment applications installed on the first mobile-computing device selected from an audio-entertainment application, a video-entertainment application, and a video game-entertainment application to record a user-initiated pause in the entertainment content and provide a pause point as an approximate point for a seamless continuation of the entertainment content.

17. The system of claim 16,
wherein the second client-entertainment module is part of a second client entertainment-companion application installed on the second computing device, and
wherein the second client entertainment-companion application is configured to cooperate with one or more entertainment applications installed on the second computing device selected from an audio-entertainment application, a video-entertainment application, and a video game-entertainment application to play the entertainment content from the pause point.

18. The system of claim 11,
wherein the first client-entertainment module is part of a first client entertainment application installed on the first mobile-computing device,
wherein the first client entertainment application is configured to stream entertainment content selected from audio-entertainment content, video-entertainment content, and video game-entertainment content from a server entertainment application installed on the server computer, and
wherein the first client entertainment-companion application is also configured to record a user-initiated pause in the entertainment content and provide a pause point as an approximate point for a seamless continuation of the entertainment content.

19. The system of claim 18,
wherein the server entertainment application is also configured to record the user-initiated pause in the entertainment content and provide the pause point as the approximate point for the seamless continuation of the entertainment content.

20. The system of claim 18,
wherein the second client-entertainment module is part of a second client entertainment application installed on the second computing device,
wherein the second client entertainment application is configured to stream entertainment content selected from audio-entertainment content, video-entertainment content, and video game-entertainment content from the server entertainment application, and
wherein the second client entertainment-companion application is also configured to play the entertainment content from the pause point.

* * * * *